United States Patent
Wendt et al.

(10) Patent No.: US 11,400,872 B1
(45) Date of Patent: Aug. 2, 2022

(54) HEAT SHIELD ASSEMBLY FOR EXHAUST TREATMENT SYSTEM

(71) Applicant: Caterpillar Inc., Peoria, IL (US)

(72) Inventors: Jeffery M. Wendt, Peoria, IL (US); Scott M. Peters, Edwards, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 17/314,474

(22) Filed: May 7, 2021

(51) Int. Cl.
*F01N 13/00* (2010.01)
*B60R 13/08* (2006.01)
*F01N 13/14* (2010.01)

(52) U.S. Cl.
CPC ........ *B60R 13/0869* (2013.01); *F01N 13/008* (2013.01); *F01N 13/14* (2013.01)

(58) Field of Classification Search
CPC .... B60R 13/0969; F01N 13/008; F01N 13/14
USPC ........................................................ 422/168
See application file for complete search history.

(56) References Cited

U.S. PATENT DOCUMENTS

| | | | |
|---|---|---|---|
| 7,537,383 B2 | 5/2009 | Althöfer et al. | |
| 7,966,979 B2* | 6/2011 | Olsen | F01N 13/00 123/41.31 |
| 7,980,132 B2 | 7/2011 | Gustin | |
| 8,696,777 B1 | 4/2014 | Patil et al. | |
| 10,119,450 B2 | 11/2018 | Minnichsoffer et al. | |
| 10,288,591 B2 | 5/2019 | Brosio et al. | |
| 10,393,001 B2 | 8/2019 | Thorn et al. | |
| 10,794,811 B2 | 10/2020 | Miyagawa et al. | |
| 2005/0005773 A1* | 1/2005 | Shutty | F01N 13/008 96/417 |
| 2007/0151539 A1* | 7/2007 | Upton | F01N 13/14 123/198 E |
| 2011/0099978 A1* | 5/2011 | Davidson | B01D 53/9495 60/297 |
| 2012/0160468 A1 | 6/2012 | Larsson | |
| 2014/0360172 A1* | 12/2014 | Saitou | F01N 3/20 60/323 |
| 2014/0373721 A1* | 12/2014 | Sandou | F01N 3/0211 55/482 |
| 2015/0000389 A1* | 1/2015 | Runde | F01N 3/021 73/114.75 |
| 2015/0160102 A1 | 6/2015 | Denis et al. | |
| 2016/0061090 A1* | 3/2016 | Anand | F01N 3/2066 60/297 |
| 2017/0184004 A1* | 6/2017 | Butler | F01N 13/008 |

(Continued)

*Primary Examiner* — Tom P Duong
(74) *Attorney, Agent, or Firm* — Leydig, Voit & Mayer, Ltd.

(57) ABSTRACT

A heat shield system for shielding sensors from heat includes a sleeve portion made of heat-insulating material and has a hollow shape sized and shaped to be wrapped about a pipe of the exhaust treatment system. The sleeve has a longitudinal slit and an opening formed through the sleeve. The opening is configured to receive a sensor. The system includes a collar portion made of heat-insulating material and includes a base part configured to attach to the sleeve portion and a collar enclosure that extends radially from the base part. The collar enclosure defines an open chamber configured to surround the sensor and shield the sensor from heat while permitting access to the sensor. A closure is configured to retain the collar portion on the sleeve portion and hold the heat shield system in place.

20 Claims, 7 Drawing Sheets

(56) References Cited

U.S. PATENT DOCUMENTS

2018/0051618 A1 2/2018 Tylutki et al.
2022/0090532 A1* 3/2022 Degner ................ F01N 13/148

* cited by examiner

HEAT SHIELD ASSEMBLY FOR EXHAUST TREATMENT SYSTEM

TECHNICAL FIELD

This disclosure relates generally to a heat shield assembly. More particularly, the present disclosure relates to a heat shield assembly for shielding exhaust sensors of exhaust treatment systems.

BACKGROUND

In order to meet Safety of Life at Sea (SOLAS) requirements, engine emission treatment systems or aftertreatment systems, sometimes referred to as Clean Emission Modules (CEM), that operate at or above a specified temperature (currently 220° Celsius), in marine applications, are required to be provided with insulation to thermally isolate the CEM from its surroundings. It is common to insulate the CEM and to provide the insulation with openings to accommodate conventional CEM sensors and electrical and/or other connections to the sensors. The sensors are used to monitor and ensure proper operation of the CEM.

Figure 1:
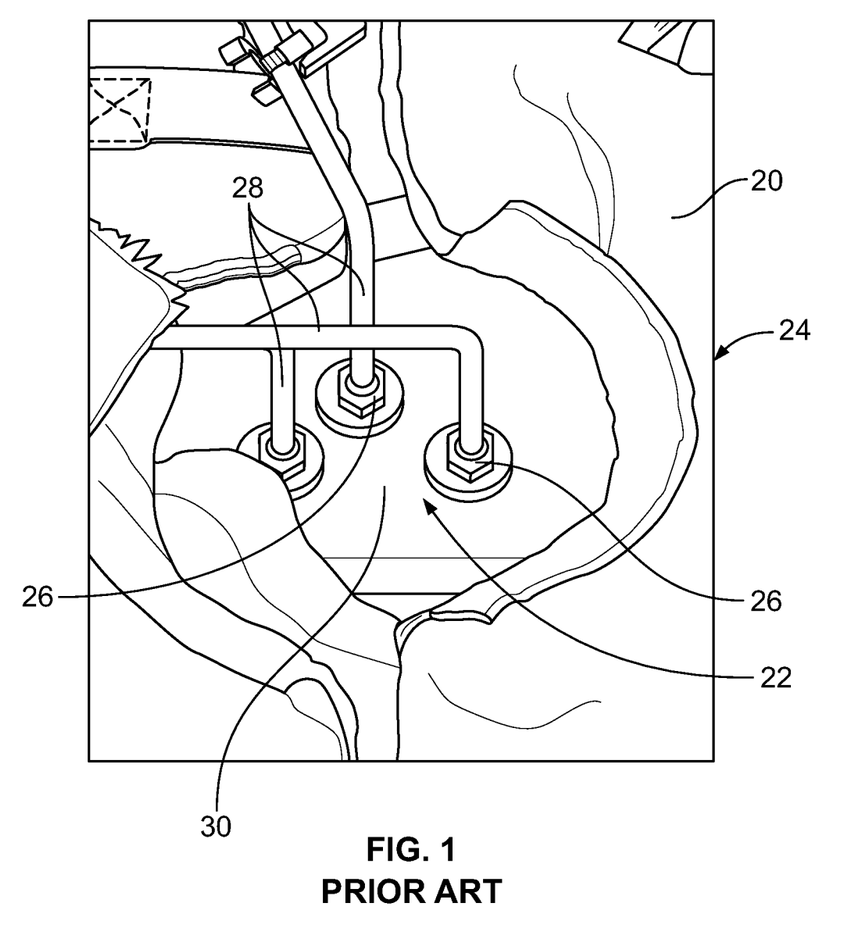
FIG. 1 is a partial view of a CEM with insulation in place.

FIG. 1 shows a close-up partial view of insulation 20 provided with an opening 22 applied to a CEM installation 24. The opening 22 permits the routing of conduits 28, which may carry electrical wires for example, through the insulation 20, which are connected to sensors 26. The sensors 26 are typically installed onto exhaust inlet or extension pipes 30 as is known. The amount of insulation 20 can vary, typically from 1 to 4 inches, in depth.

It has been found that the above configuration creates a flow channel or chimney that directs and concentrates heat generated by the operation of the CEM into the space occupied by the sensors 26. The result is that the sensors 26, in the illustrated configuration, are prone to premature failure from the exposure to heat. There is a need to insulate a CEM in a marine application for safe operation thereof and there is a need to ensure that sensors are protected from heat. The present disclosure satisfies the need.

The foregoing background discussion is intended solely to aid the reader. It is not intended to limit the innovations described herein, nor to limit or expand the prior art discussed. Thus, the foregoing discussion should not be taken to indicate that any particular element of a prior system is unsuitable for use with the innovations described herein, nor is it intended to indicate that any element is essential in implementing the innovations described herein. The implementations and application of the innovations described herein are defined by the appended claims.

SUMMARY

In one aspect, a heat shield system is disclosed for shielding sensors from heat from an exhaust treatment system including a sleeve portion made of a heat-insulating material and having a hollow shape sized and shaped to be wrapped about a pipe of the exhaust treatment system. The sleeve has a longitudinal slit and at least one opening formed through the sleeve. The opening is shaped and sized to receive a sensor therethrough. The system includes a collar portion made of a heat-insulating material. The collar portion includes a base part sized and shaped to attach to the sleeve portion and a collar enclosure that extends radially from the base part. The collar enclosure defines an open chamber shaped and sized to surround the sensor and shield the sensor from heat while permitting access to the sensor. A closure is configured to retain the collar portion on the sleeve portion and hold the heat shield system in place.

In still another aspect, an engine exhaust treatment system is disclosed including an exhaust pipe configured to receive engine exhaust. At least one housing includes an emissions treatment component. The emissions treatment component is configured to treat exhaust emissions. A sensor is disposed on the exhaust pipe. A heat shield system is disposed on the exhaust pipe and configured to shield the sensor from heat. The heat shield system includes a sleeve portion made of a heat-insulating material and is sized and shaped to be wrapped about the exhaust pipe. The sleeve has a longitudinal slit and at least one opening formed through the sleeve, the opening shaped and sized to receive the sensor therethrough. A collar portion is made of a heat-insulating material and includes a base part sized and shaped to attach to the sleeve portion and a collar enclosure that extends radially from the base part. The collar enclosure defines an open chamber shaped and sized to surround the sensor and shield the sensor from heat while permitting access to the sensor and a collar closure is configured to retain the collar portion on the sleeve portion and hold the heat shield system in place.

In yet another aspect, an exhaust sensor assembly of an aftertreatment system is disclosed. The assembly includes an exhaust pipe configured to receive engine exhaust. A sensor is disposed on the exhaust pipe and configured to sense the engine exhaust gas in the exhaust pipe. An insulation covering is disposed over the exhaust pipe and the covering includes an opening formed around the sensor. A heat shield system is disposed on the exhaust pipe and is configured to extend through the opening and prevent the insulation covering from covering the sensor and configured to insulate the sensor from heat from the exhaust pipe.

DETAILED DESCRIPTION

Figure 2:
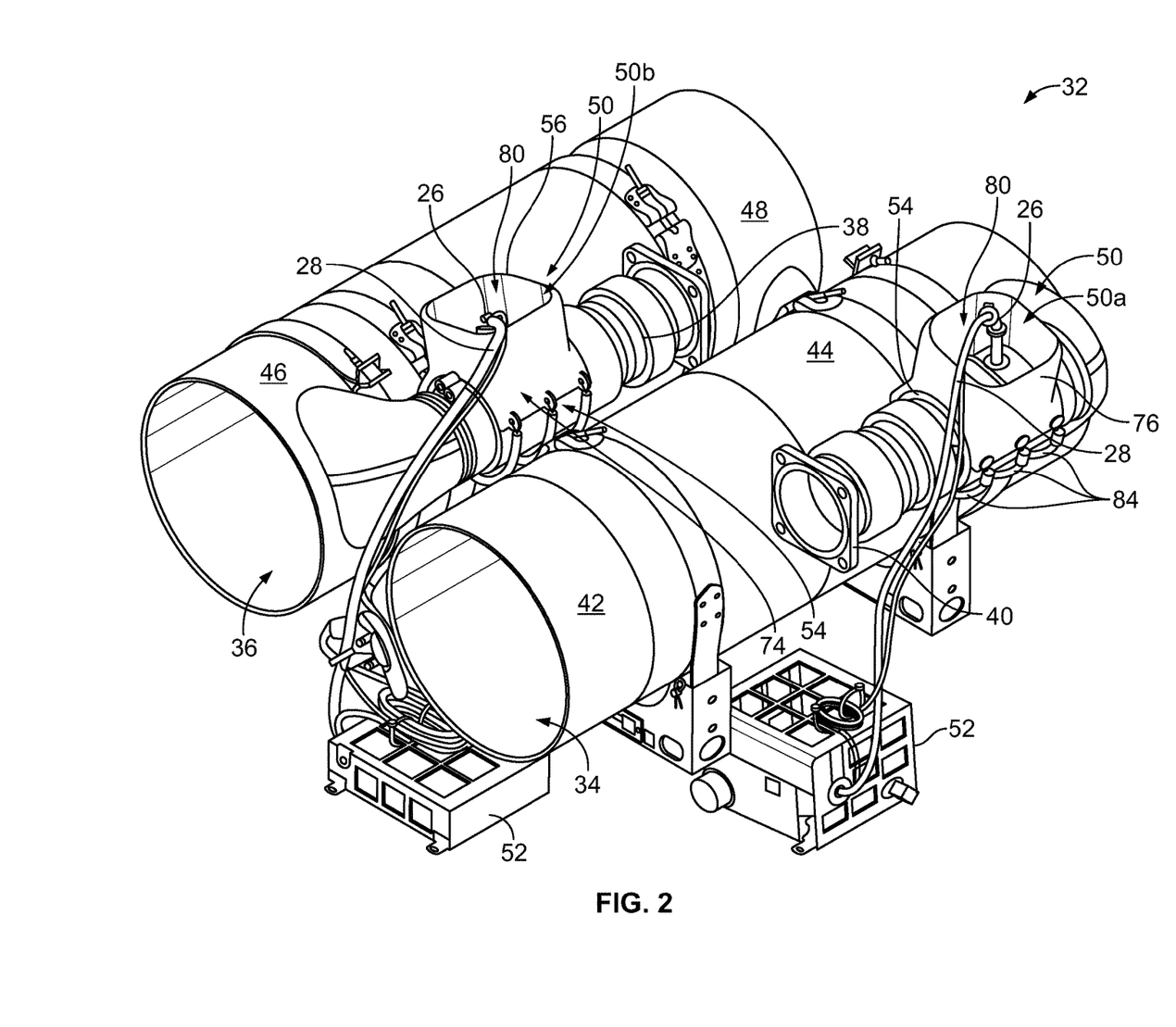
FIG. 2 is a perspective view of a CEM according to the disclosure with insulation omitted and two heat shield assemblies in place.

Now referring to the drawings, wherein like elements refer to like reference numbers, there is illustrated an aftertreatment system 32 arranged and packaged in a compact form. It will be understood that the configuration of the illustrated aftertreatment system 32 is only one example of a system that is suitable for employing one or more heat shield assembly according to the disclosure and that other configurations are contemplated. Furthermore, the illustrated aftertreatment system 32 is shown in FIG. 2 without an insulation covering for clarity and to provide one example of an arrangement of components of an aftertreatment system. It will be understood that aftertreatment systems incorporating the heat shield assemblies according to the disclosure will be provided an insulative covering as shown in FIG. 1. Therefore, it will be understood that the following description of an aftertreatment system 32 is to provide context for the environment in which a heat shield assembly according to the disclosure may be applied.

The illustrated exemplary aftertreatment system 32 may be in the form of a compact module that reduces size and weight while allowing for arrangement of the various devices and routing of exhaust gases in a suitable manner. Referring to FIG. 2, to accommodate the devices that treat the exhaust emissions, the aftertreatment system 32 can include a first or upstream housing 34 and a second or downstream housing 36, which are both generally cylindrical in shape and may be manufactured as metal drums or cans from, for example, stainless steel or aluminum.

When assembled the first and second housing 34, 36 can be disposed parallel to each other. To establish fluid communication between the upstream module housing 34 and the downstream module housing 36, a transfer pipe or transfer conduit 38 may be disposed therebetween such that exhaust gasses flow from the upstream module housing 34 to the downstream module housing 36. The transfer conduit 38 may be a cylindrical, elongated tube that may be smaller in diameter than either the upstream module housing 34 or the downstream module housing 36. Because the upstream axial ends of the upstream and downstream module housings 34, 36 may be disposed relatively coextensive to each other, and downstream axial ends of the upstream and downstream module housings may be disposed relatively coextensive to each other, the transfer conduit 38 needs to reverse and redirect the flow of exhaust gasses.

The operational components of the aftertreatment system 32 that treat exhaust emissions from an attached engine, such as a diesel engine, can be of any suitable type, order, and configuration to advantageously stage the different reactions with the exhaust gases. For example, the first housing 34 may include a supplemental selective catalytic reduction catalyst 42 (SCR) to receive and treat raw exhaust gases. The supplemental SCR substrate associated with the supplemental SCR catalyst 42 can be formed as a cylindrical substrate brick with the substrate matrix, such as a honeycomb or wire mesh, disposed in a tubular shell that can be secured adjacent the inner wall of the upstream module housing 34.

A diesel oxidation catalyst (DOC) 44 can be disposed in series immediately downstream of, and axially aligned with, the supplemental SCR catalyst 42 of the upstream module housing 34. The DOC 44 can also be formed as a cylindrical brick with a diameter complementary to the upstream module housing 34. In a possible embodiment, an ammonia oxidation catalyst (AMOX) (not shown) may be included between the supplemental SCR catalyst 42 and the DOC 44 in the upstream module housing 34.

The exhaust gases exiting the upstream module housing 34, in this embodiment, are redirected by the transfer conduit 38 approximately 180° to enter the downstream module housing 36. The exhaust gases entering the downstream module housing 36 may enter a diesel particulate filter (DPF) 46 disposed inside the second module housing 36 for removal of particulate matter. The DPF 46 can be axially aligned with a primary SCR 48 disposed downstream thereof in the downstream module housing 36. The primary SCR 48 reduces the NOx in the exhaust gases, which are then discharged from the downstream module housing 36. Both the DPF 46 and the primary SCR 48 can be formed as cylindrical bricks for accommodation in the cylindrical downstream module housing 36. Injection of exhaust treatment material, such as urea and so on, is performed as is well known.

Exhaust gases from an engine exhaust manifold of an engine, such as a diesel engine (not shown), enter the aftertreatment system 32 via an exhaust pipe 40 upstream of and in communication with the upstream module housing 34. At least one sensor 26, configured to acquire data regarding temperature, oxygen concentration, particulates, pressure, NOx, or other exhaust gas parameters, as required by the design of the system, are positioned on the exhaust pipe 40 to acquire data regarding the exhaust gases entering the aftertreatment system from the engine. Sensors 26 may also be deployed on the transfer pipe 38 located between the first and second housings 34, 36. A heat shield assembly 50 is positioned and configured to protect, both thermally and physically, the sensors 26 at both of the above noted positions. Both heat shield assemblies 50 have the same construction, and therefore only one will be described herein.

As is known, the sensors 26 are in communication with an electronic controller 52. In the exemplary embodiment, there are two controllers 52, one for each of the two illustrated location of sensors 26. Controller 52 may be an electronic controller that operates in a logical fashion to perform operations, execute control algorithms, store and retrieve data and other desired operations. Controller 52 may include or access memory, secondary storage devices, processors, and any other components for running an application. The memory and secondary storage devices may be in the form of read-only memory (ROM) or random access memory (RAM) or integrated circuitry that is accessible by the controller. Various other circuits may be associated with each controller 52 such as power supply circuitry, signal conditioning circuitry, driver circuitry, and other types of circuitry.

The controller 52 may be a single controller or may include more than one controller as is shown in FIG. 2 to collect and process data from various sensors 26. The term "controller" is meant to be used in its broadest sense to include one or more controllers and/or microprocessors that may be associated with the aftertreatment system 32. The functionality of the controller 52 may be implemented in hardware and/or software.

Each of the sensors 26 are in communication with the controllers 52 via electrical wiring or other communication means, which may be housed within conduits 28 which are configured structurally and of well-known materials to protect the wiring from heat, water, impact, and other challenges from the marine or other operating environment to which the aftertreatment system 32 is exposed.

FIG. 2 shows two heat shield assemblies 50. One heat shield assembly 50a is disposed on and fastened about the exhaust pipe 40 with at least one sensor 26 positioned therewithin, and another heat shield assembly 50b is disposed on and fastened about the transfer pipe 38 with at least one sensor 26 positioned therewithin.

Figure 3:
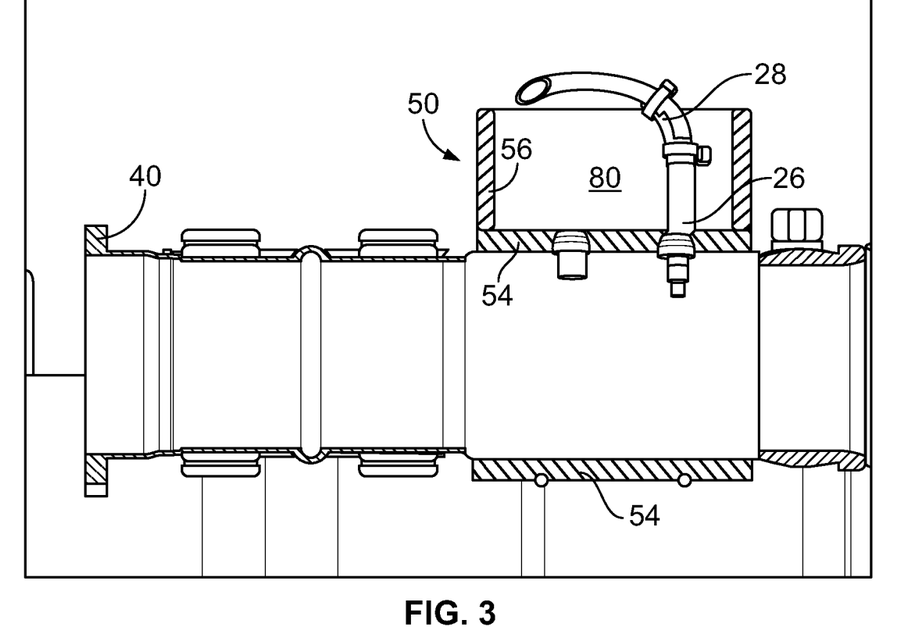
FIG. 3 is a cross section view of a heat shield assembly according to the disclosure.
Figure 4:
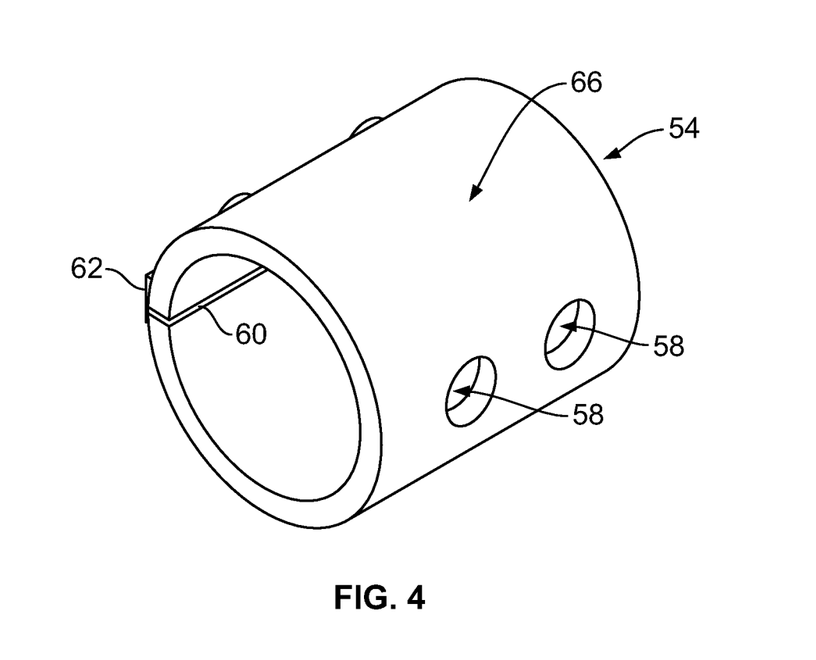
FIG. 4 is a perspective view of an insulation sleeve according to the disclosure which forms a base part of the heat shield assembly.
Figure 5:
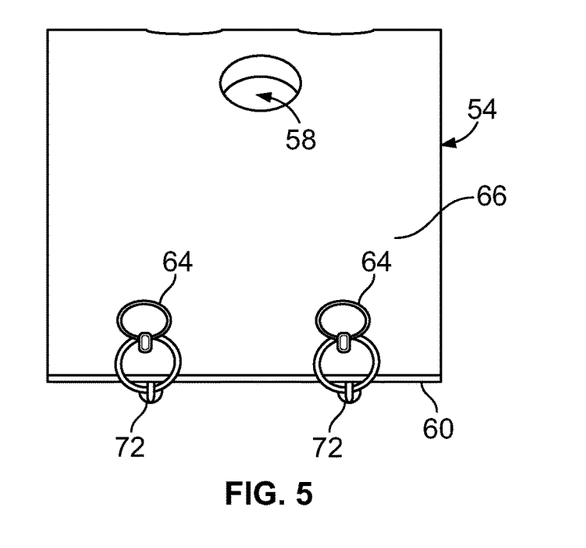
FIG. 5 is a side view of the insulation sleeve of FIG. 4.
Figure 6:
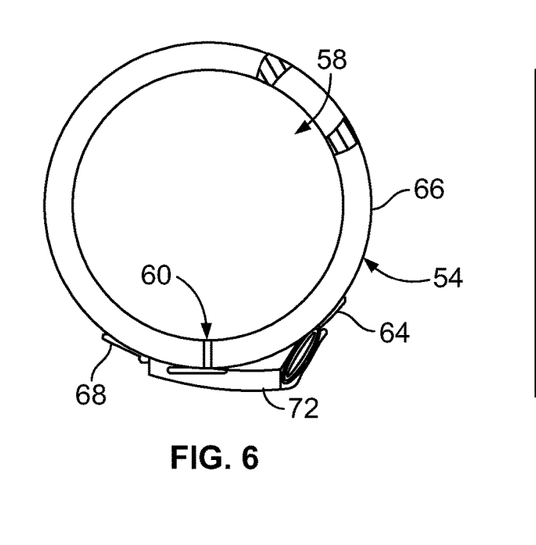
FIG. 6 is an end view the insulation sleeve of FIG. 4.

Turning to FIGS. 3-12 each of the heat shield assemblies 50 includes two main parts, a sleeve portion 54 and a collar portion 56. The sleeve portion 54, as shown in FIG. 4 is a flexible shape that is shaped and sized to be wrapped about a pipe of the aftertreatment system 32. The shape of the sleeve portion 54 may be an open tube, may be cylindrical, or any other shape that surrounds a pipe. For example, the sleeve portion 54 is sized to envelop a length of the exhaust pipe 40 as shown in FIG. 3, or the transfer pipe 38, that incorporates the sensor 26. To accommodate the sensor 26, the sleeve portion 54 includes one or more opening 58 formed through the material of the sleeve. In an embodiment, the sleeve 54 may be made of coated fiberglass and can be a thickness of about ¼ inches to about 1 inch in thickness. Other types of thermally insulative materials or combinations or materials are contemplated for the sleeve 54 capable of conforming to various pipe shapes and sizes, withstanding the operating conditions in the vicinity of the sensor, and reducing exposure of the sensors 26 from heat from the operation of an attached engine (not shown) and the components of the aftertreatment system 32.

The sleeve 54 has a longitudinal opening or slit 60 that permits the sleeve to open and expand, receive the pipe interiorly, and close to retain the sleeve in position wrapped about the pipe. Generally, the sleeve 54 can be considered generally circular but configured to open to a C-shape for mounting onto a pipe 38, 40. The sleeve 54 is sufficiently flexible such that it can be elastically deformed/opened to receive pipe 38, 40 and closed around the pipe to become generally circular to surround and attach to the pipe. The sleeve 54 has an optional sleeve closure 62 that both functions to close the slit 60 and retain the sleeve in position when mounted to a pipe 38 or 40.

Figure 7:
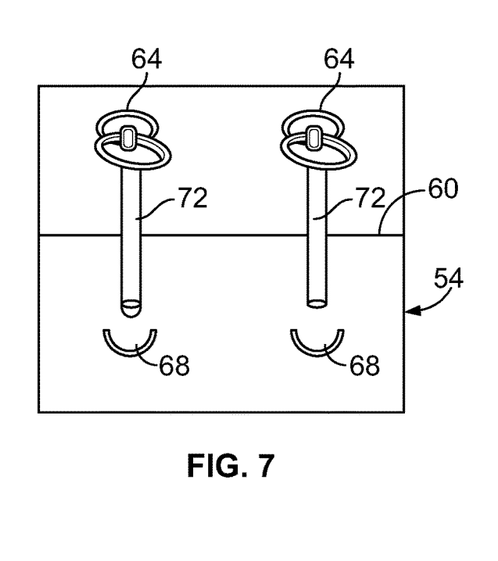
FIG. 7 is a bottom view the insulation sleeve of FIG. 4.

In one embodiment, the closure 62 has a fixture 64 that is bonded adhesively or otherwise attached to the outside 66 of the sleeve adjacent to and on one side of the slit 60 and a corresponding second fixture 68 that is bonded adhesively or otherwise attached to the outside 66 of the sleeve adjacent to and on the other side of the slit 60 from the first fixture. The fixtures 64, 68 may be hooks or other devices with the capability of anchoring or retaining or enabling the interconnection of the sides of the sleeve adjacent the slit. A tension spring 72 may be connected to the first and second hooks 64, 68 to bias the sleeve 54 into a closed condition. Tension springs 72 typically have a hook or loop formed at the end thereof to facilitate attachment to, for example, hooks 64, 68. The closure 62 may employ other elements to close the slit 60 after positioning of the sleeve 54. The closure 62 may include two of each of the pairs of hooks 64, 68 and springs 72 in a longitudinally spaced apart configuration as best seen in FIG. 7.

Figure 8:
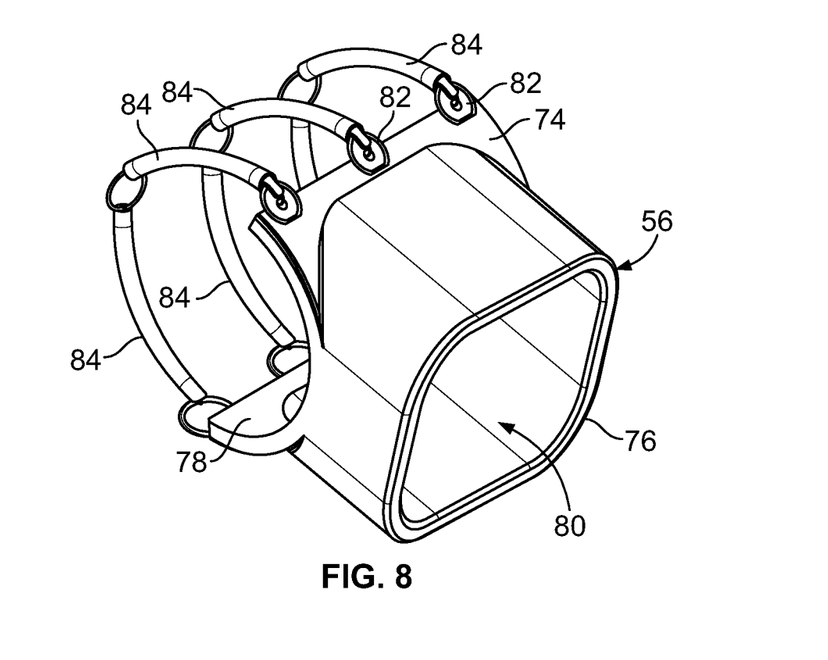
FIG. 8 is a perspective view of an insulation collar according to the disclosure which forms a part of the heat shield assembly.
Figure 9:
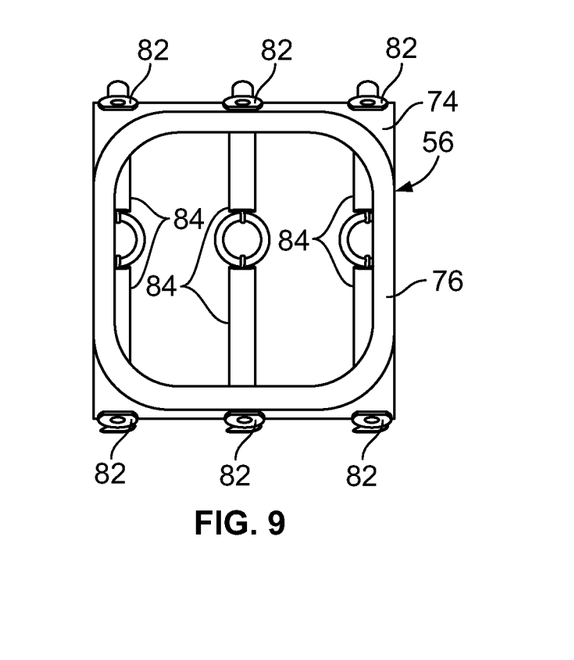
FIG. 9 is a top view of the insulation collar of FIG. 8.

Turning to FIGS. 8 and 9, the collar portion 56 may be made of a fiberglass insulation covered with a stainless steel foil. Other types of thermally insulative materials or combinations of materials, preferably foil backed or covered, are contemplated that have sufficient stiffness to maintain the shape of the collar 56 and resist deformation during installation and during operation.

The collar portion 56 includes an arcuate base part 74 that is shaped and sized to contactingly mate with the positioned sleeve 54. In particular, the base or mounting part 74 has an open, radially inward arcuate face 78 that is configured to contactingly seal against an installed sleeve 54 to the extent that ingress of hot air from heated gases passing through and generated by operation of the emissions treatment portions 42, 44, 46, 48 of the system 32 and radiated by the housings 34, 36 and channeled toward the heat shield assemblies by insulation 20 (FIG. 1) is prevented from entering into the interior chamber 80 from between the sleeve and the collar 56. The interior chamber 80 is also open and is accessible from the outside, in a direction away from the base part 74, such that the interior chamber may be accessed from the outside and also air circulation is permitted between the outside environment and the interior chamber but excluded to the extent possible from the covered aftertreatment system 32.

The collar portion 56 includes a collar enclosure 76 that may be formed of a one-piece construction with the base part and of the same material. The collar enclosure 76 extends radially outwardly from the base and may have a generally rectangular, hollow shape defining the interior chamber 80. Accordingly, the interior chamber 80 forms a passageway through the base 74 and the collar portion 56 that is open in the radially inward direction and the radially outward direction. Radially, in this context, is perpendicular to a longitudinal axis of a pipe to which the heat shield system is attached.

In an embodiment, the collar enclosure 76 generally includes four sidewalls and may extend from about 1 inches to about 4 inches or more from the base 74 depending on the application and the amount or thickness of insulation to be added to the aftertreatment system 32 and excluded from the chamber 80. In other words, the height of the collar 76 should extend a distance sufficient to protect the sensors inside the interior chamber from the heat of the system 32 and prevent insulation 20 from covering the chamber 80.

The size and shape of the interior chamber 80 should accommodate the sensor 26 or several sensors, in addition to accommodating the conduit 28 attached to the sensor(s) and enables airflow around the sensors so as to promote cooling of the sensors. At the same time, the sidewalls of the collar enclosure 76 prevents insulation 20 (see FIG. 1) from covering the interior chamber 80. Because the chamber 80 is insulated by the material of the sleeve portion 54 at a bottom of the chamber and the collar portion 56 by the sidewalls, sensor(2) 26 in the chamber are thermally isolated from the effects of exhaust and heat generated by functional components of the aftertreatment system operating to reduce emissions in the exhaust.

Figure 10:
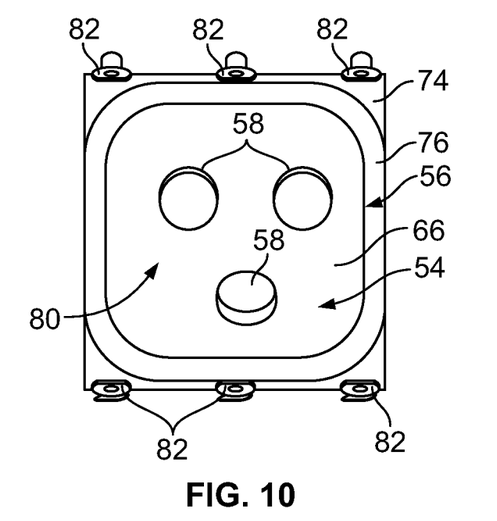
FIG. 10 is a top view of the insulation collar of FIG. 8 and the insulation sleeve of FIG. 4 assembled into a heat shield assembly according to the disclosure.

The collar portion 56 is held in place over an installed sleeve portion 54 by attaching the collar portion 56 over the sleeve portion such that the openings 58 in the sleeve are positioned inside the collar enclosure 76 and accessible from the outside as shown in FIG. 10. Attachment of the collar portion 56 about the sleeve portion 54 and therefore on an exhaust or transfer pipe 38, 40, may take place with any suitable means taking into account that the attachment should not be affected materially by heat and a harsh marine environment and accommodate different sizes and/or shapes of pipes.

Figure 11:
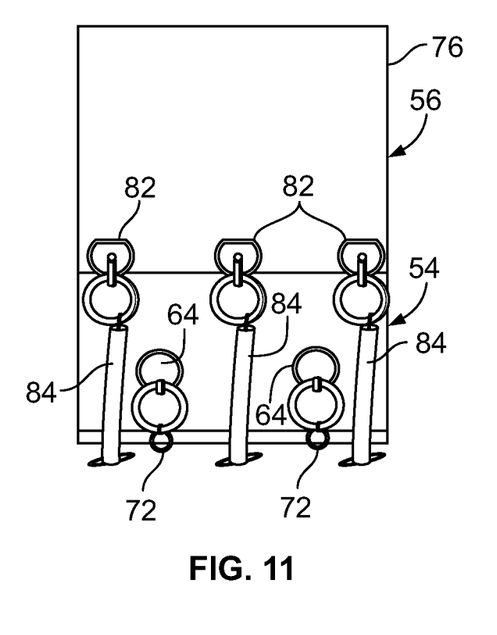
FIG. 11 is a side view of the heat shield assembly of FIG. 10.
Figure 12:
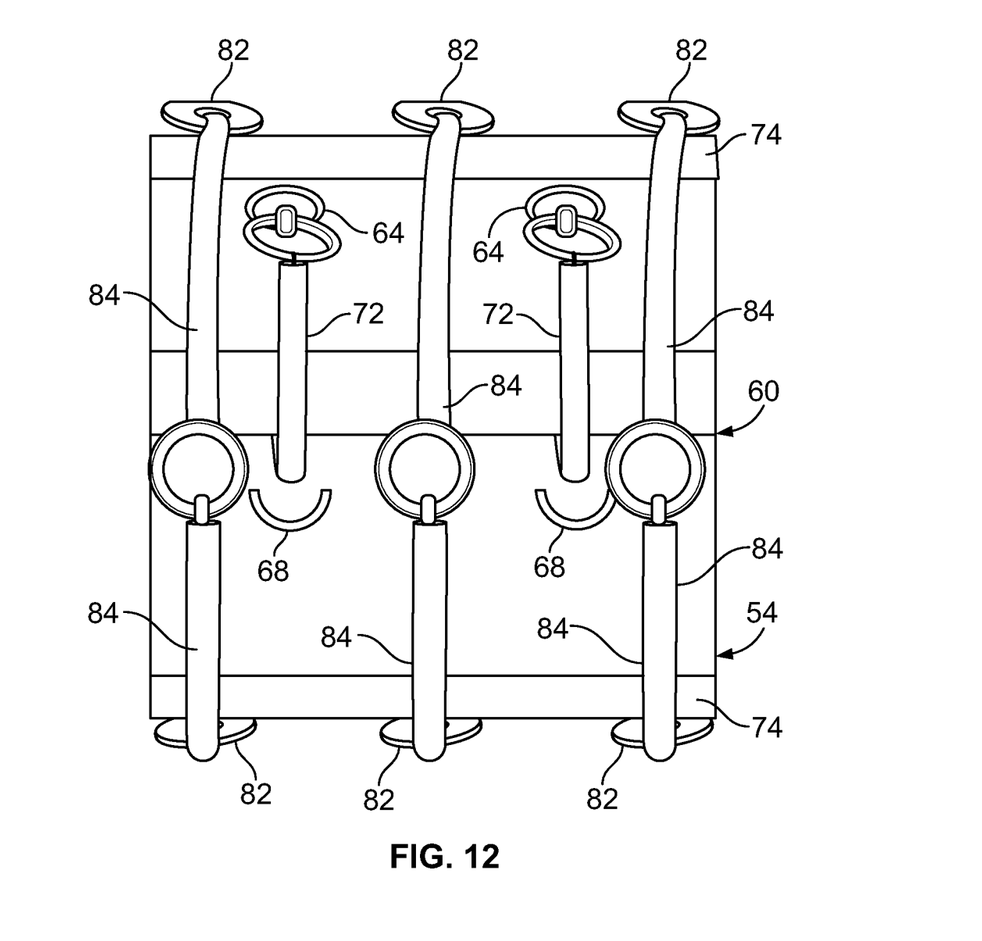
FIG. 12 is a bottom view of the heat shield assembly of FIG. 10.

In one embodiment, the attachment means for the collar portion 56 is similar to that of the sleeve portion 54. The collar portion 56 may have several hooks 82 that are, for example, tack welded onto the foil outer portion of the base 74. Hooks 82 are arranged across the base 74 in opposing pairs that are interconnectable with, for example, tension springs 84 in a fashion similar to that on the sleeve portion 54. There may be three pairs of hooks 82 and three tension springs 84, one spring for each pair of hooks. In another embodiment, each pair of hooks 82 are interconnected by a pair of tension springs 84 connected end-to-end. The position of each of the pair of hooks 82 may be arranged so as to not interfere with the hooks and springs 64, 68, 72 of the sleeve portion as shown in FIGS. 11 and 12 in an interleaved pattern, for example.

During installation of the heat shield assembly 50, the sleeve 54 is positioned such that each of the sensors 26 extend through a respective opening 58. The sleeve 54 is opened via spreading the slit 60 and placed over the target pipe. The sleeve 54 is closed over the pipe and tension springs 72 are connected to hooks 64 and 68 about the outside 66 of the sleeve to secure the sleeve in position. After the sleeve 54 is secured, the collar portion 76 is positioned over the sleeve (FIG. 10) and secured by interconnecting pairs of the collar hooks 82 with tension springs 84 in a similar fashion as that of the sleeve. The sensors 26 can be installed and/or connected to conduits 28 and insulation covering 20 can be positioned over the aftertreatment system 32 while avoiding covering up the open end 86 of each collar 76. The heat shield assembly 50 thereby reduces the exposure of the sensors 26 to heat from the part of the exhaust pipe adjacent to each sensor and also reduces exposure of heat from the CEM that is funneled in the direction of the sensors by the insulation covering 20.

Still further, the systems described herein may be applicable other types of exhaust treatment systems and other applications where it is desired to protect sensors from heat.

INDUSTRIAL APPLICABILITY

The industrial applicability of the system described herein will be readily appreciated from the forgoing discussion. The foregoing discussion is applicable to machines that use systems to reduce exhaust emissions and to applications where sensors would benefit from shielding from heat sources.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. A heat shield system for shielding sensors from heat from an exhaust treatment system comprising:
   a sleeve portion comprising a heat-insulating material and having a hollow shape that is sized to be wrapped about a pipe of the exhaust treatment system, the sleeve having a longitudinal slit and at least one opening formed through the sleeve, the opening configured to receive a sensor therethrough; and
   a collar portion comprising a heat-insulating material, the collar portion comprising a base part configured to attach to the sleeve portion and a collar enclosure that extends radially from the base part, the collar enclosure defining an open chamber configured to surround the sensor and shield the open chamber sensor from heat while permitting access thereto; and
   a collar closure configured to retain the collar portion on the sleeve portion and hold the heat shield system in place.

2. The system of claim 1 wherein the heat-insulating material of the sleeve portion is a silicone coated fiberglass material.

3. The system of claim 1 wherein the sleeve portion further comprises a sleeve closure including a pair of fixtures attached to an outside of the sleeve portion on opposing sides of the slit.

4. The system of claim 3 wherein each of the pair of fixtures includes a hook.

5. The system of claim 4 wherein the sleeve closure includes a tension spring configured to attach to the hooks of the pair of fixtures.

6. The system of claim 3, comprising a pair of sleeve closures in a spaced apart configuration.

7. The system of claim 1 wherein the heat-insulating material of the collar portion includes a foil material disposed on the outside thereof.

8. The system of claim 7 wherein the foil material is a stainless steel foil.

9. The system of claim 7 wherein the collar closure includes a pair of fixtures attached to the base part in a spaced-apart configuration and a tension spring configured to attached to the pair of fixtures and retain the collar portion on the sleeve portion.

10. The system of claim 9 wherein each of the pair of fixtures comprises a hook welded to the foil material.

11. The system of claim 9 wherein the collar closure includes at least two pairs of fixtures.

12. The system of claim 1 wherein the base part includes a face that is curved to match the shape of the sleeve portion.

13. The system of claim 12 wherein the base part is configured to seal to the sleeve portion when attached thereto.

14. The system of claim 1 wherein the collar enclosure is formed as a one-piece construction with the base part.

15. The system of claim 14 wherein the collar enclosure includes four sidewalls that extend from the base part.

16. An engine exhaust treatment system comprising:
   an exhaust pipe configured to receive engine exhaust;
   a housing comprising an emissions treatment component, the emissions treatment component configured to treat exhaust emissions;
   a sensor disposed on the exhaust pipe;
   a heat shield system disposed on the exhaust pipe and configured to shield the sensor from heat, the heat shield system comprising:
      a sleeve portion comprising a heat-insulating material configured to be wrapped about the exhaust pipe, the sleeve having at least one opening formed through the sleeve, the opening configured to receive the sensor therethrough; and
      a collar portion comprising a heat-insulating material, the collar portion comprising a base part configured to attach to the sleeve portion and a collar enclosure that extends radially from the base part, the collar enclosure defining an open chamber configured to surround the sensor and shield the sensor from heat while permitting access to the sensor; and a collar closure configured to retain the collar portion on the sleeve portion and hold the heat shield system in place.

17. The system of claim 16 further comprising an insulation covering disposed over the exhaust pipe, the insulation covering including an opening formed around the sensor and the housing and wherein the heat shield system is configured to extend through the opening and exclude the insulation covering from covering the open chamber.

18. The system of claim 16 further comprising a first housing comprising a first emissions treatment component and a second housing comprising a second emissions treatment component and a transfer pipe connecting the first housing and the second housing and configured to permit flow of exhaust gases from the first housing to the second housing;

a sensor disposed on the transfer pipe; and a second heat shield system disposed on the transfer pipe and configured to shield the sensor on the transfer pipe from heat.

19. An exhaust sensor assembly of an aftertreatment system, the assembly comprising:

an exhaust pipe configured to receive engine exhaust gas;

a sensor disposed on the exhaust pipe and configured to sense the engine exhaust gas in the exhaust pipe;

an insulation covering disposed over the exhaust pipe, the insulation covering including an opening formed around the sensor;

a heat shield system disposed on the exhaust pipe and configured to extend through the opening and prevent the insulation covering from covering the sensor and configured to insulate the sensor from heat from the exhaust pipe, the heat shield system comprising:

a sleeve portion comprising a heat-insulating material configured to be wrapped about the exhaust pipe; and a collar portion comprising a heat-insulating material, the collar portion comprising a base part configured to sealingly attach to the sleeve portion and a collar enclosure that extends radially from the base part.

20. The assembly of claim 19 wherein the sleeve portion comprises a longitudinal slit and at least one opening formed through the sleeve, the opening shaped and sized to receive the sensor therethrough;

wherein the collar portion defines an open chamber configured to surround the sensor and shield the sensor from heat while permitting access to the sensor; and a collar closure configured to retain the collar portion on the sleeve portion and hold the heat shield system in place.

* * * * *